United States Patent

Nonaka et al.

Patent Number: 5,892,596
Date of Patent: *Apr. 6, 1999

[54] IMAGE PROCESSING APPARATUS CAPABLE OF REFORMING MARKER EDITING

[75] Inventors: Takashi Nonaka, Yokohama; Fumio Mikami, Chigasaki, both of Japan

[73] Assignee: Canon Kabushiki Kaisha

[ * ] Notice: This patent issued on a continued prosecution application filed under 37 CFR 1.53(d), and is subject to the twenty year patent term provisions of 35 U.S.C. 154(a)(2).

[21] Appl. No.: 896,430

[22] Filed: Jul. 17, 1997

Related U.S. Application Data

[63] Continuation of Ser. No. 302,418, Sep. 8, 1994, abandoned.

[30] Foreign Application Priority Data

Sep. 14, 1993  [JP]  Japan ................................. 5-252589

[51] Int. Cl.⁶ .................................................. H04N 1/62
[52] U.S. Cl. .................... 358/538; 358/296; 358/453; 358/537; 358/452; 382/162; 382/164
[58] Field of Search ................................. 358/296, 453, 358/538, 530, 537, 448, 451, 452; 382/162, 164, 165, 167, 175

[56] References Cited

U.S. PATENT DOCUMENTS

| | | |
|---|---|---|
| 4,538,182 | 8/1985 | Saito et al. . |
| 4,856,074 | 8/1989 | Nagaoka ................................. 382/48 |
| 4,937,662 | 6/1990 | Matsunawa et al. .................... 358/538 |
| 4,942,461 | 7/1990 | Abe et al. ............................... 358/530 |
| 5,016,096 | 5/1991 | Matsunawa et al. .................... 358/453 |
| 5,130,791 | 7/1992 | Abe ......................................... 358/453 |
| 5,177,603 | 1/1993 | Kojima ................................... 358/453 |
| 5,206,719 | 4/1993 | Ikeda et al. ............................. 358/453 |
| 5,216,498 | 6/1993 | Matsunawa et al. .................... 358/518 |
| 5,241,609 | 8/1993 | Hasebe et al. .......................... 382/61 |
| 5,243,442 | 9/1993 | Narukawa ............................... 358/453 |
| 5,259,041 | 11/1993 | Kato et al. .............................. 382/48 |
| 5,289,297 | 2/1994 | Bollman et al. ........................ 358/537 |
| 5,311,336 | 5/1994 | Kurita et al. ........................... 358/453 |
| 5,363,212 | 11/1994 | Taniuchi et al. ....................... 358/537 |
| 5,465,307 | 11/1995 | Azumaya et al. ...................... 358/453 |
| 5,539,524 | 7/1996 | Hasebe et al. .......................... 358/296 |
| 5,548,663 | 8/1996 | Sekine et al. .......................... 382/164 |
| 5,666,207 | 9/1997 | Ohmura ................................... 358/452 |
| 5,668,896 | 9/1997 | Kitamura et al. ...................... 382/162 |
| 5,745,248 | 4/1998 | Nickerson .............................. 358/296 |
| 5,748,345 | 5/1998 | Ozaki et al. ........................... 358/537 |

FOREIGN PATENT DOCUMENTS

| | | |
|---|---|---|
| 0349780 | 1/1990 | European Pat. Off. . |
| 0365310 | 4/1990 | European Pat. Off. . |
| 0396982 | 11/1990 | European Pat. Off. . |
| 0441575 | 8/1991 | European Pat. Off. . |
| 2505518 | 11/1982 | France . |

*Primary Examiner*—Peter S. Wong
*Assistant Examiner*—Derek J. Jardieu
*Attorney, Agent, or Firm*—Fitzpatrick, Cella, Harper & Scinto

[57] ABSTRACT

An image processing apparatus includes a reading unit, a determining unit, a converting unit, a recording unit, and a control unit. The reading unit moves sensors corresponding to a predetermined number of pixels aligned along a sub-scanning direction in a main scanning direction to read an image having a predetermined width of an original. The determining unit determines an area designated by a marker in the original in accordance with pixel data of a pixel read by the reading unit and pixel data of pixels surrounding the pixel. The converting unit converts the pixel data of the pixel read by the reading unit in accordance with a determination result from the determining unit. The recording unit drives recording elements corresponding to the predetermined number of pixels aligned along the sub-scanning direction in accordance with pixel data from the converting unit and moving the recording elements in the main scanning direction to record the image having the predetermined width on a sheet. The control unit moves the reading unit in the sub-scanning direction by a distance corresponding to pixels less than the predetermined number of pixels to perform a next main scanning operation after the reading unit completes a main scanning operation.

55 Claims, 18 Drawing Sheets

| COLOR CODE | MARKER COLOR |
|---|---|
| 0 | WHITE |
| 1 | CYAN |
| 2 | PINK |
| 3 | YELLOW |
| 4 | GREEN |
| 5 | ORANGE |
| 6 | VIOLET |
| 7 | RED |
| 8 | BLUE |
| 9 | BLACK |

MAIN SCANNING →
SUB-SCANNING ↓
IMAGE DATA (COLOR CODE)

CURRENT COLOR
128

PRECEDING COLOR
AREA MODE
SIDE COLOR COUNTER
SIDE BLACK COUNTER
LINE DETERMINATION COLOR
PAINT DETERMINATION COLOR

DELAY DATA

FIG. 8

| DELAY | | | SET COUNTER | | DELAY | INPUT DATA | DETERMINATION | | PROCESSING AFTER DETERMINATION |
|---|---|---|---|---|---|---|---|---|---|
| PAINT DETERMI- NATION COLOR | LINE DETERMI- NATION COLOR | AREA MODE | SIDE COUNTER | | PRECEDING COLOR | CURRENT COLOR | AREA MODE | PRINT COLOR | COLOR SETTING PROCESSING |
| | | | BLACK | COLOR | | | | | |
| | | | | | | | | | |
| | | | | | | | | | |
| | | NORMAL (0) | 0 | | WHITE | WHITE | NORMAL | WHITE | |
| | | | 1 | | | BLACK | NORMAL | BLACK | |
| | | | | 0 | | COLOR | PAINT | CURRENT COLOR | CURRENT COLOR → PAINT COLOR |
| | | | | 1 | | | PAINT | CURRENT COLOR | CURRENT COLOR → PAINT COLOR |
| | | | | | | | LINE | WHITE | CURRENT COLOR → LINE COLOR |
| | | | | | BLACK | WHITE | NORMAL | WHITE | |
| | | | | | | BLACK | NORMAL | BLACK | |
| | | | | | | COLOR | PAINT | CURRENT COLOR | CURRENT COLOR → PAINT COLOR |
| | | | | | COLOR | WHITE | | | |
| | | | | | | BLACK | | | |
| | | | | | | COLOR | | | |

FIG. 9

| DELAY | | | | | | | INPUT DATA | DETERMINATION | | PROCESSING AFTER DETERMINATION |
|---|---|---|---|---|---|---|---|---|---|---|
| PAINT DETERMI- NATION COLOR | LINE DETERMI- NATION COLOR | AREA MODE | SIDE COUNTER | | SET COUNTER | | PRECEDING COLOR | CURRENT COLOR | AREA MODE | PRINT COLOR | COLOR SETTING PROCESSING |
| | | | BLACK | COLOR | BLACK | COLOR | | | | | |
| N = 0 | | PAINT (1) | 0 | | | | WHITE | WHITE | PAINT | PAINT COLOR | |
| | | | 1 | | 0 | | | BLACK | NORMAL | BLACK | 0 → PAINT COLOR |
| N ≠ 0 | | | | 0 | | 1 | | | NORMAL | BLACK | 0 → PAINT COLOR |
| | | | | 1 | | | | | PAINT | BLACK | |
| | | | | | | | | COLOR | PAINT | CURRENT COLOR | CURRENT COLOR → PAINT COLOR |
| | | | | | | | | | PAINT | CURRENT COLOR | CURRENT COLOR → PAINT COLOR |
| | | | | | | | | | LINE | WHITE | CURRENT COLOR → LINE COLOR |
| | | | | | | | | COLOR CURRENT COLOR=N | PAINT | PAINT COLOR | |
| | | | | | | | | CURRENT COLOR≠N | NEST PAINT | PAINT COLOR | CURRENT COLOR → LINE COLOR |
| | | | | | | | BLACK | WHITE | PAINT | PAINT COLOR | |
| | | | | | 0 | | | BLACK | PAINT | BLACK | |
| | | | | | 1 | | | COLOR | PAINT | CURRENT COLOR | CURRENT COLOR → PAINT COLOR |
| | | | | | | 0 | COLOR | WHITE | PAINT | PAINT COLOR | COLOR → PRECEDING COLOR |
| | | | | | | 1 | | BLACK | NORMAL | BLACK | 0 → PAINT COLOR |
| | | | | | | | | COLOR | PAINT | CURRENT COLOR | CURRENT COLOR → PAINT COLOR |

FIG. 10

| DELAY | | SET COUNTER | | DELAY | INPUT DATA | DETERMINATION | | PROCESSING AFTER DETERMINATION |
|---|---|---|---|---|---|---|---|---|
| PAINT DETERMI- NATION COLOR | LINE DETERMI- NATION COLOR | SIDE COUNTER | | PRECEDING COLOR | CURRENT COLOR | AREA MODE | PRINT COLOR | COLOR SETTING PROCESSING |
| | AREA MODE | BLACK | COLOR | | | | | |
| | LINE (2) | | | WHITE | WHITE | | | |
| | | | | | BLACK | | | |
| | | | | | COLOR | | | |
| | | | | BLACK | WHITE | NORMAL | WHITE | |
| | | | | | BLACK | LINE | LINE COLOR | 0 → LINE COLOR |
| | | | | | COLOR | LINE | WHITE | |
| | | | | COLOR | WHITE | NORMAL | WHITE | |
| | | | | | BLACK | LINE | LINE COLOR | 0 → LINE COLOR |
| | | | | | COLOR | LINE | WHITE | |
| | NEST LINE (3) | | | WHITE | WHITE | | | |
| | | | | | BLACK | | | |
| | | | | | COLOR | | | |
| | | | | BLACK | WHITE | PAINT | PAINT COLOR | |
| | | | | | BLACK | NEST LINE | LINE COLOR | |
| | | | | | COLOR | NEST LINE | PAINT COLOR | |
| | | | | COLOR | WHITE | PAINT | PAINT COLOR | |
| | | | | | BLACK | NEST LINE | LINE COLOR | |
| | | | | | COLOR | NEST LINE | PAINT COLOR | |

| COLOR CODE | MARKER COLOR | C | M | Y | K |
|---|---|---|---|---|---|
| 0 | WHITE | 0 | 0 | 0 | 0 |
| 1 | CYAN | 70 | 20 | 0 | 0 |
| 2 | PINK | 0 | 80 | 20 | 0 |
| 3 | YELLOW | 0 | 0 | 80 | 0 |
| 4 | GREEN | 50 | 0 | 70 | 0 |
| 5 | ORANGE | 0 | 40 | 100 | 0 |
| 6 | VIOLET | 40 | 80 | 0 | 0 |
| 7 | RED | 0 | 100 | 80 | 0 |
| 8 | BLUE | 100 | 80 | 20 | 0 |
| 9 | BLACK | 0 | 0 | 0 | 140 |
|  | BLUEBACK | 200 | 100 | 0 | 0 |

FIG. 13

| DETERMINING COLOR FOR PRINTING / BACK | | | STANDARD BACK | STANDARD BLUEBACK | BLUEBACK WITH BLACK IN PAINT AREA |
|---|---|---|---|---|---|
| WHITE | | | WHITE TABLE | BLUEBACK TABLE | BLUEBACK TABLE |
| BLACK | PAINT | | DENSITY×A | PAINT COLOR TABLE ×INVERSION DENSITY ÷128 | DENSITY×A |
| | OTHER | | | BLUEBACK TABLE ×INVERSION DENSITY ÷128 | BLUEBACK TABLE ×INVERSION DENSITY ÷128 |
| COLOR | PAINT | | EACH COLOR TABLE | EACH COLOR TABLE | EACH COLOR TABLE |
| | LINE | | EACH COLOR TABLE×DENSITY ×B÷128 | EACH COLOR TABLE×DENSITY ×B÷128 | EACH COLOR TABLE×DENSITY ×B÷128 |

READING

RECORDING

IMAGE PROCESSING APPARATUS CAPABLE OF REFORMING MARKER EDITING

This application is a continuation of application Ser. No. 08/302,418, filed Sep. 8, 1994, now abandoned.

BACKGROUND OF THE INVENTION

1. Field of the Invention

The present invention relates to an image processing apparatus capable of performing marker editing.

2. Related Background Art

When image editing is to be performed in a conventional color copying machine, prescanning is performed in advance to store data necessary for editing. For this purpose, a large memory is required. Hence, a serial scanning method has been receiving a great deal of attention because it needs no large memory.

If the serial scanning method is applied to the conventional image processing apparatus, a large memory is unnecessary. However, since an original is scanned for every band, the image cannot be processed using information in a wide image area, and much time is needed to read all the images. For this reason, image processing by color marking using the serial scanning method (to be referred to as marker editing hereinafter) is currently out of use.

SUMMARY OF THE INVENTION

It is an object of the present invention to provide an image processing apparatus for reading the image of an original, determining an area designated by a marker in the original, converting the image in the determined area, and recording the converted image in synchronism with reading.

The other objects, features, and advantages of the present invention will be apparent from the following detailed description of the preferred embodiments in conjunction with the accompanying drawings.

BRIEF DESCRIPTION OF THE DRAWINGS

FIG. 8 is a view showing area determining conditions;

FIG. 9 is a view showing area determining conditions;

FIG. 10 is a view showing area determining conditions;

FIG. 13 is a view showing output conversion conditions;

DESCRIPTION OF THE PREFERRED EMBODIMENTS

An embodiment of the present invention will be described below with reference to the accompanying drawings.

Figure 1:
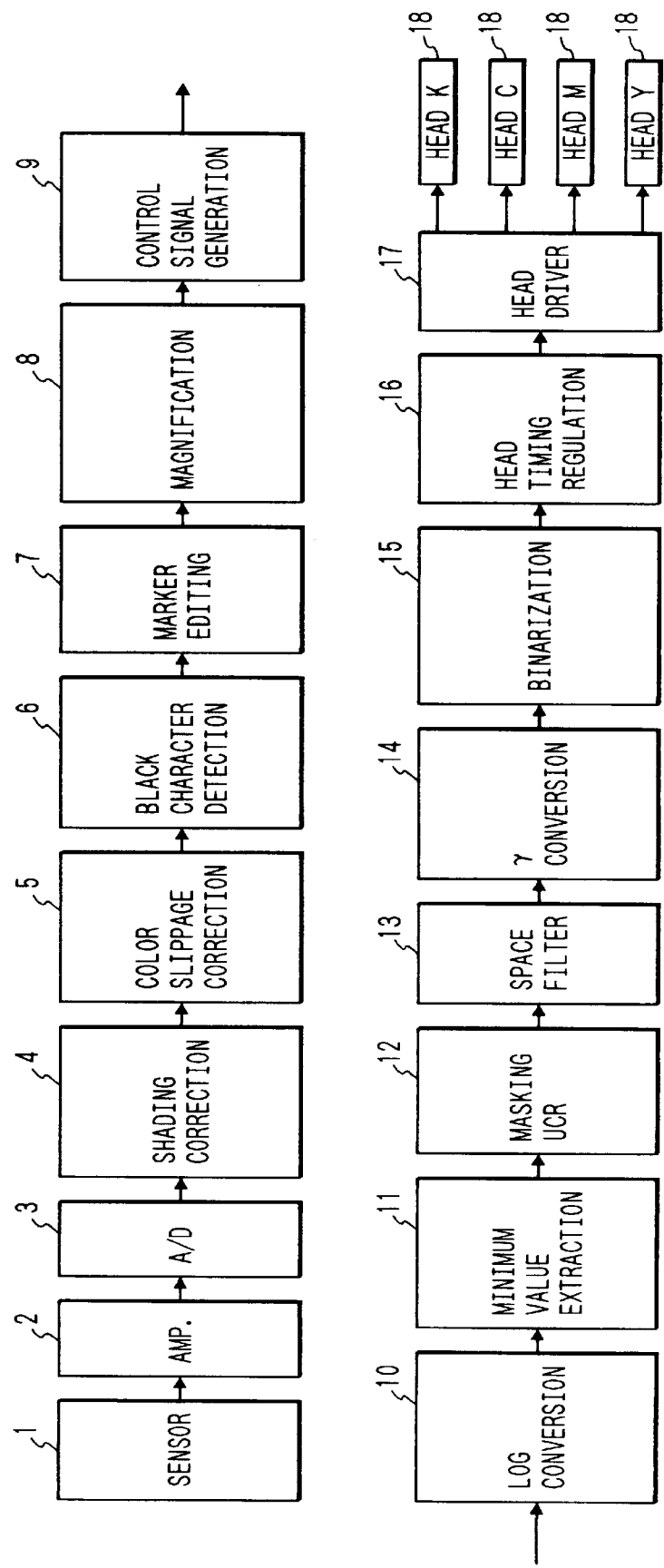
FIG. 1 is a block diagram schematically showing the arrangement of an image processing apparatus (full-color copying machine) according to the first embodiment of the present invention.
Figures 2A, 2B, 2C:
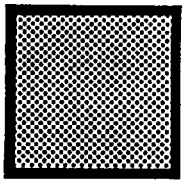
FIGS. 2A to 2C are views showing specifications of marker editing executed by the apparatus shown in FIG. 1.

FIG. 1 is a block diagram schematically showing the arrangement of an image processing apparatus (full-color copying machine) according to the first embodiment of the present invention. FIGS. 2A to 2C are views showing specifications of marker editing performed by the apparatus shown in FIG. 1.

When a monochrome original is colored by a color marker to perform marker editing, an output as shown in FIGS. 2A, 2B, or 2C is obtained.

(1) If a predetermined closed section of the original is to be painted, the inside of the closed section is marked (e.g., a portion separated from a black line by 1 mm or less is marked). In this case, an output is obtained such that the inside of the closed section is painted with a color (FIG. 2A).

(2) If the color of the black line of the original is to be converted, the black line is marked to be included in a marker (e.g., the periphery of the black line is painted by a width of 1 mm or more). In this case, the black line is replaced with a marker color (FIG. 2B).

(3) If both the processes (1) and (2) are to be performed, the inside of the closed section is painted in combination of the processes (1) and (2). In this case, a portion included in a marker is replaced with a marker color (FIG. 2C).

The arrangement of the image processing apparatus for realizing these processes will be described below.

Referring to FIG. 1, a CCD line sensor (scanner) 1 reads the image of an original to output RGB data. An amplifier 2 for amplifying the RGB data, an A/D converter 3 for quantizing the amplified RGB data into an 8-bit digital value, a shading correction circuit 4 for shading-correcting the quantized RGB data, a color slippage correction circuit 5 for correcting the position slippage of the read RGB data, a black character detection circuit 6 for detecting a black character from the RGB data to generate a black character signal, and a marker editing circuit 7 for performing marker editing (to be described later) are sequentially connected to the output side of the CCD line sensor 1.

A magnification circuit 8 for performing magnification change such as enlargement and reduction, a control signal generation circuit 9 for generating a control signal used by a space filter circuit 13 or a binarization circuit 15 (both will be described later), a LOG conversion circuit 10 for performing LOG conversion in accordance with a LOG table, a minimum value extraction circuit 11 for extracting a minimum value in the CMY (cyan, magenta, and yellow) data obtained upon LOG conversion, a masking UCR circuit 12 for performing masking and UCR by matrix calculation, the space filter circuit 13 for performing edge emphasis or smoothing processing, a γ conversion circuit 14 for performing γ conversion in accordance with a γ table, the binarization circuit 15 for binarizing 8-bit multivalued data by the dither method or the like, a head timing regulation circuit 16 for regulating the timing of ink ejection between four-color (CMYK) heads of a TJ (thermal jet) ink head, and a head driver circuit 17 for driving the regulated heads are sequentially connected to the output side of the marker editing circuit 7. Four-color (CMYK) TJ ink heads 18 are connected to the output side of the head driver circuit 17. As shown in FIG. 19, the scanner 1 can read 128 pixels along the sub-scanning direction and scans an image in the main scanning direction. The TJ heads 18 have nozzles corresponding to 128 pixels along the sub-scanning direction. The nozzles are arranged in the order of C, M, Y, and K in the main scanning direction. The TJ heads 18 print color images in synchronism with the scanning operation of the scanner 1 while moving in the main scanning direction. Since reading and recording are performed in synchronism with each other, an inexpensive apparatus can be realized without any large memory.

Figure 3A:
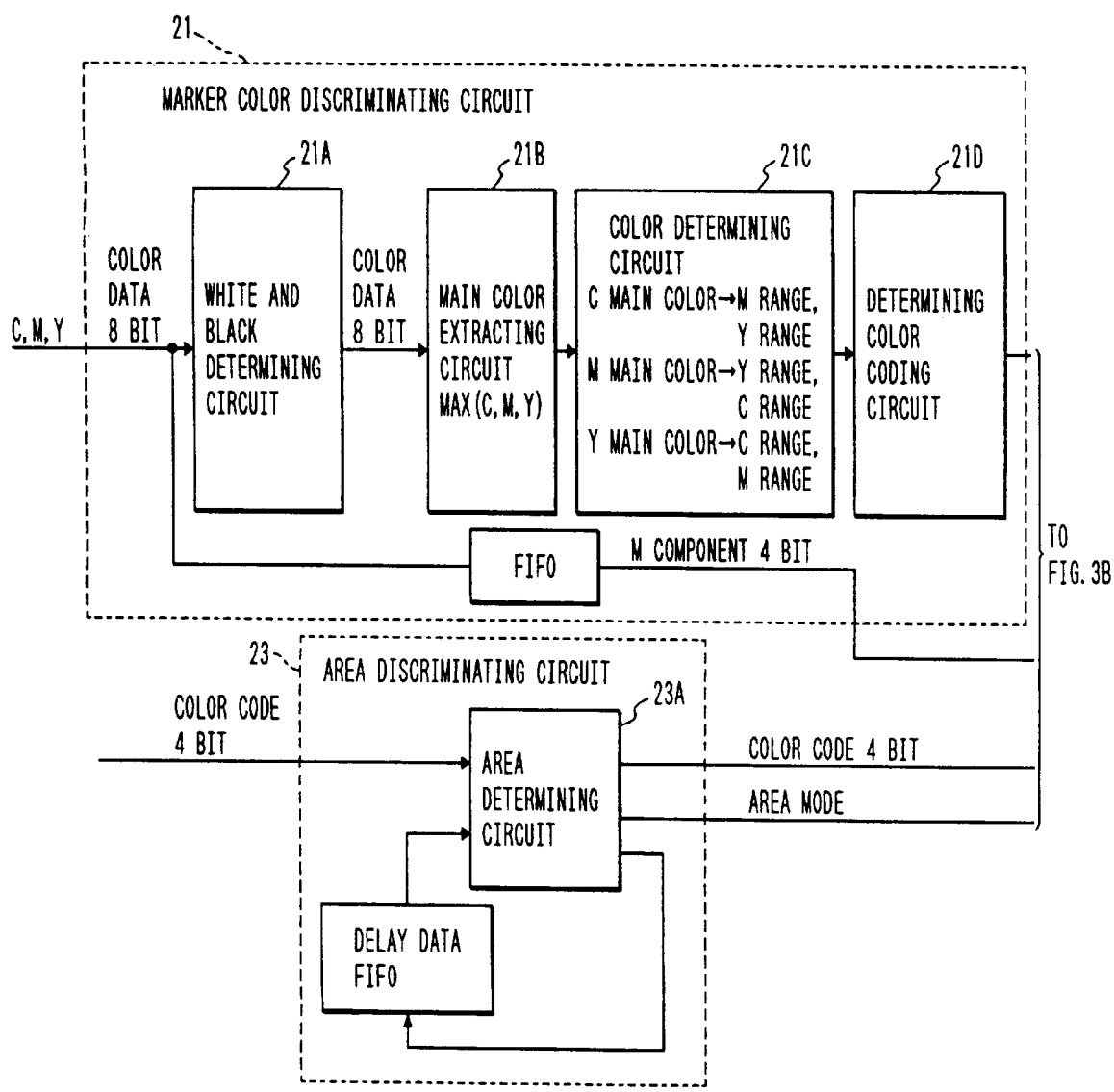
FIG. 3 which is comprised of FIGS. 3A and 3B is a block diagram showing the internal arrangement of a marker editing circuit 7 in FIG. 1.
Figure 3B:
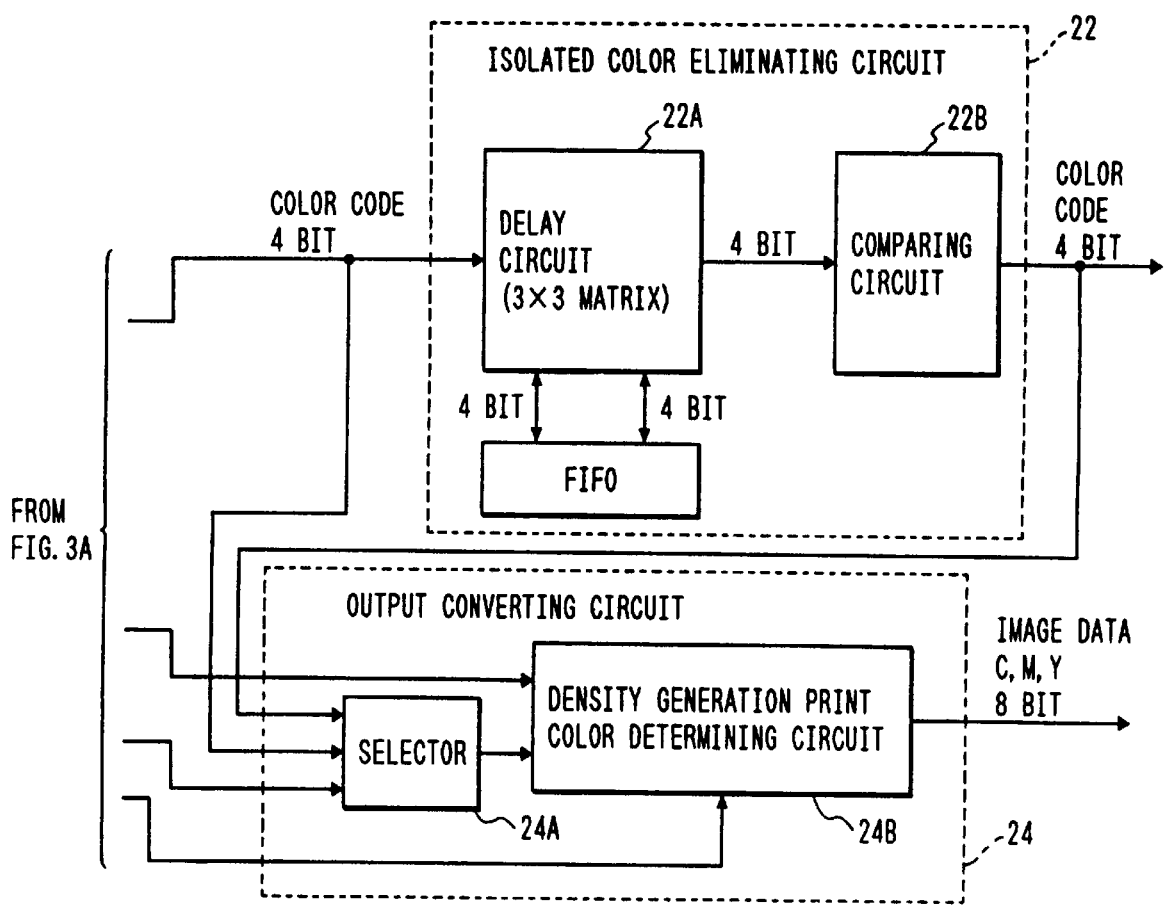

FIGS. 3A and 3B are block diagrams showing the internal arrangement of the marker editing circuit 7 in FIG. 1.

LOG conversion of the RGB data read by the scanner is performed. The converted data is input as a data set of three colors of CMY (each of CMY data is represented by 8 bits) for one pixel. Each of the CMY data has a value of 8 bits (0 to 255). However, when marker editing is to be performed, the LOG conversion circuit 10 and the masking UCR circuit 12 are set in a through state.

First of all, the CMY data is input to a white and black determining circuit 21A of a marker color discriminating circuit 21. The white and black determining circuit 21A has white and black threshold values. If all of the CMY values are smaller than the white threshold value, the pixel is determined as a white pixel. If all of the CMY values are larger than the black threshold value, the pixel is determined as a black pixel. A pixel determined as a white or black pixel is coded by a determining color coding circuit 21D.

A pixel determined as a color pixel other than white and black pixels is input to a main color extracting circuit 21B. The main color extracting circuit 21B outputs the maximum one of the CMY components. This maximum component is defined as the main color. Subsequently, a color determining circuit 21C performs color determination.

Figure 4A:
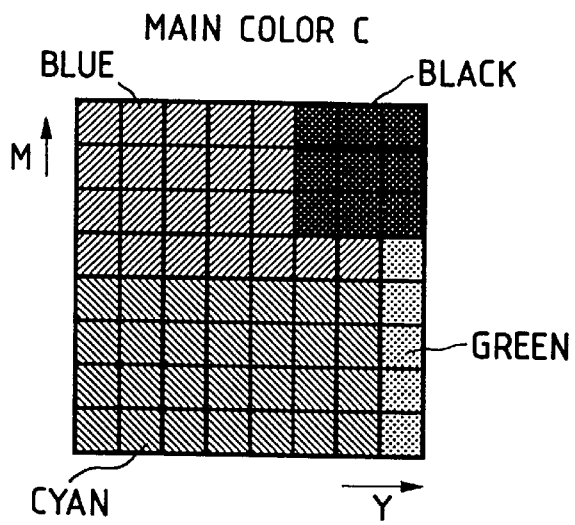
FIGS. 4A to 4C are views showing a color determining method.
Figure 4B:
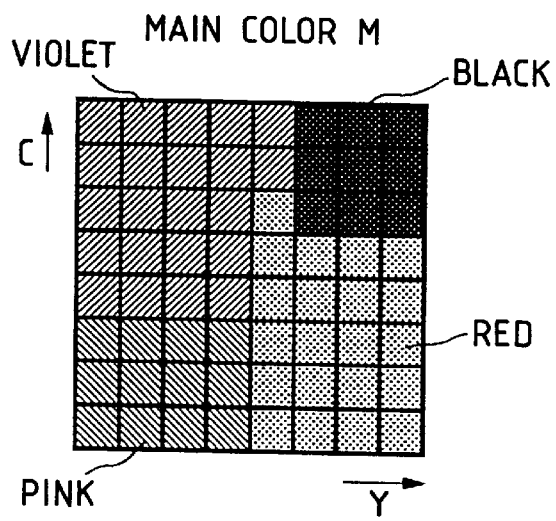
Figure 4C:
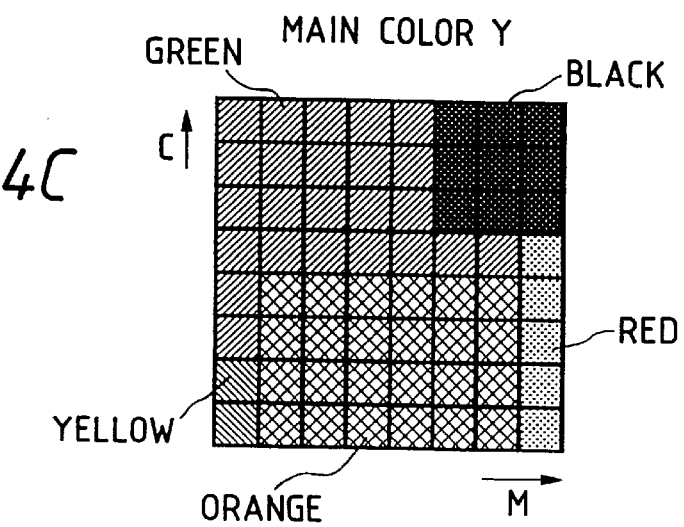

The determining method will be described. A color is determined in accordance with the CMY component ratio. The ratio of each of the remaining two components to the main color component obtained from the main color extracting circuit 21B is obtained. The determining color is determined on the basis of the relationship between the CMY components and the determining color shown in FIGS. 4A to 4C. For example, if the main color is M (magenta), the ratio of C (cyan) to M is 3/8 or less, and the ratio of Y (yellow) to M is 5/8 or less, the pixel is determined as a P (pink) pixel in accordance with FIG. 4B. If the ratio of CMY data is almost 1:1:1, this portion is determined to be black (the upper right portions in FIGS. 4A to 4C). This is because a light black (gray) portion is also determined to be black although its CMY values do not reach the black threshold value, and the pixel is not subjected to white and black determination. That is, a black pixel is determined in two steps. A determining color may be determined with reference to a lookup table or by a comparator. The reason why the CMY component ratio is used for determination is that a color has a specified CMY ratio, and its value remains almost the same regardless of the density of a color.

Figures 5, 6:
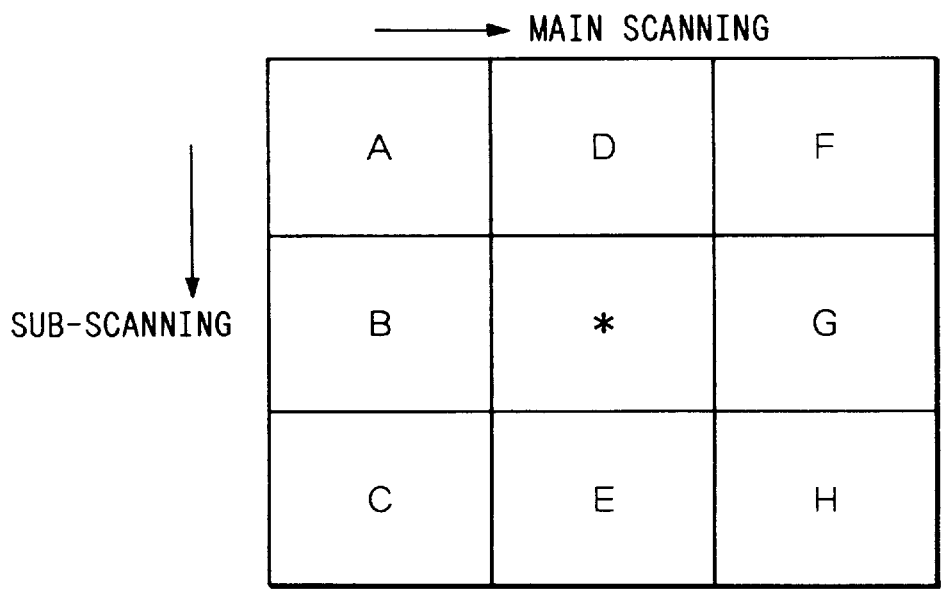
FIG. 5 is a view showing a color code table.
FIG. 6 is an explanatory view of isolated color eliminating processing.

An output from the color determining circuit 21C is converted into a 4-bit color code by the determining color coding circuit 21D, as shown in FIG. 5. The color code is sent from the marker color discriminating circuit 21 to an isolated color eliminating circuit 22. In isolated color eliminating processing by the isolated color eliminating circuit 22, the color of a central pixel of interest is determined with reference to its neighboring pixels in a matrix of 3×3 with the pixel of interest at the center, as shown in FIG. 6. If the color of a pixel of interest * is different from that of a pixel A, and the color of the pixel of interest * is different from that of a pixel H, the color of the pixel of interest * is assumed to be the color of the pixel A. This process is defined as (1). Similarly, the color of the pixel * is determined by the following processes.

(1) *≠A and *≠H→*=A (2) *≠C and *≠F→*=C (3) *≠D and *≠E→*=D (4) *≠B and *≠G→*=B

These processes are executed in the order of (1) to (4). The pixel of interest is changed in accordance with the conditions which are met. A delay circuit 22A stores eight pixels around the pixel of interest. A comparing circuit 22B compares the colors of these pixels with each other. The reason why the color of the pixel of interest is changed in accordance with its left or upper pixel is as follows. Main scanning is performed from left to right, and sub-scanning is performed downward. For this reason, before the color of the pixel of interest is determined, isolated color eliminating processing of pixels on the left and upper side of the pixel of interest has been completed. The color of the pixel of interest is changed in accordance with the processed pixels. With this processing, noise can be removed from the pixels with noise.

With this processing, however, a thin line corresponding to one pixel may be inadvertently omitted. This poses a problem on reproducibility of a thin black character. For this reason, as for a black pixel, there are provided two modes, i.e., a mode which uses the isolated color eliminating processing and a mode which does not use the processing. An output from the isolated color eliminating circuit 22 is input to an area discriminating circuit 23 as a 4-bit color code.

The area discriminating circuit 23 will be described below.

The area discriminating circuit 23 having an area determining circuit 23A determines the mode of each pixel of an image. There are four modes, i.e., a normal mode, a paint mode, a line mode, and a line in paint mode. In the normal mode, no processing is performed, and the initial value is set in this mode. In the paint mode, the inside of a closed section is painted, as shown in FIG. 2A, although the black line at the boundary is set in the normal mode. In the line mode, the black line is replaced with a color line, as shown in FIG. 2B. The line in paint mode is a combination of the paint mode and the line mode, as shown in FIG. 2C. The line mode in the paint mode is called the line in paint mode.

This area determining processing is performed as shown in FIG. 7. The scanner can read 128 pixels along the sub-scanning direction. Color data obtained upon reading and color determination of each of current pixels and delay data of immediately preceding pixels along the main scanning direction are stored in the FIFO memory of the area discriminating circuit 23. The delay data includes a paint determination color for determining a color in the paint mode, a line determination color for determining a color in the line mode or the line in paint mode, an area mode, a count value of a horizontal black distance counter (the counting operation is performed up to a predetermined distance-in the equal-magnification copy mode, a full count is reached with 16 pixels (width of 1 mm)) for storing a distance from a black pixel to the immediately preceding pixel along the moving direction of the sensors (main scanning direction), a count value of a side color counter for storing a distance from a color pixel to the immediately preceding pixel along the horizontal direction (main scanning direction), and a preceding color as the color of a pixel read one line before. In various combinations of the delay data and the read current color data, the print color of each scanned pixel is determined. Additionally, of the current color data represented by 128 pixels, the upper 16 pixels and the lower 16 pixels used for counter calculation for determining the colors of pixels within a range of 1 mm from a pixel of interest, as shown in FIG. 14B. That is, 96 pixels of the scanned 128 pixels are edited and recorded by the TJ heads. Therefore, in the marker editing mode, when scanning of one line is completed, the scanner moves downward by a distance corresponding to 96 pixels and scans the next line.

Detailed examples of the combinations (marker editing area mode determining conditions) are shown in FIGS. 8 to 10.

The marker editing area mode is determined in accordance with the delay data, the input data, and the counter on the left side of FIGS. 8, 9, or 10. "0" in the column of the counter represents that a full count has not been reached yet, and "1" represents a full count. An empty column represents that any condition can be accepted.

Assume that the preceding color is "white" in the paint mode, and the current color is "color". With reference to the vertical and horizontal black counters, if at least one of the counters is not "FULL", the pixel of interest is set in the paint mode. In this case, the current color is printed, and the current color is set as the paint determination color. The processing is performed following these procedures. Even when marking is not strictly made adjacent to a black line, the marker is considered to be adjacent to the black line as long as the gap therebetween is 1 mm or less, so the marker editing processing can be performed. The reason why not a projection but a gap is used as a marking condition is as follows. A gap can be corrected again when it is too large although a projection cannot be corrected.

Figures 11, 12:
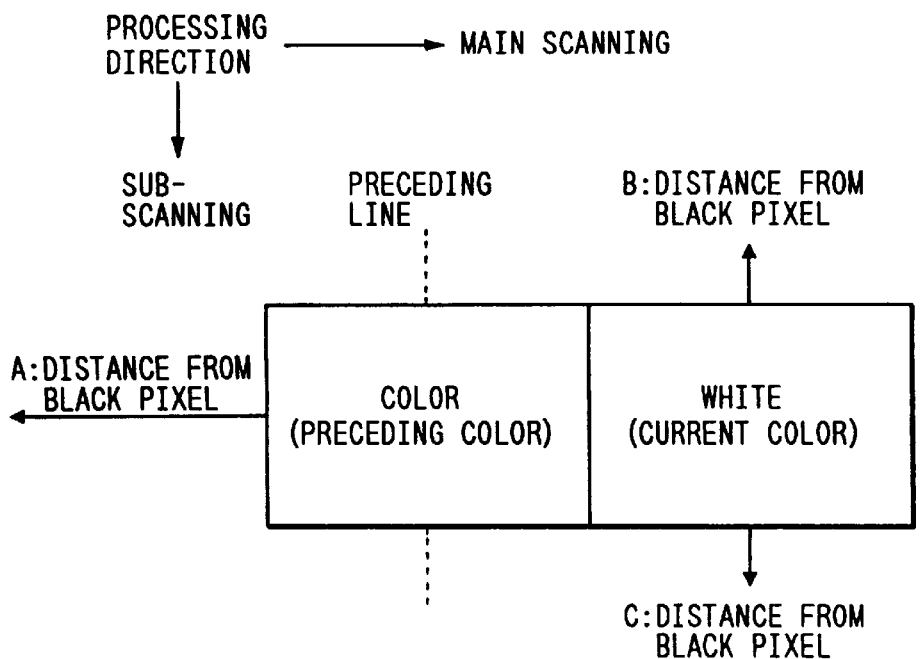
FIG. 11 is a view showing tailing processing.
FIG. 12 is a view showing an output color table.
Figure 20:
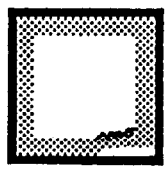
FIG. 20 is a view for explaining tailing processing.

Since a marker as shown in FIG. 20 causes an erroneous operation, tailing processing is added to the area determining processing to avoid the erroneous operation. In FIG. 11, assume that the pixel of interest (current color) is "white", and the preceding color is "color" in the paint mode. If the pixel of interest is close to any one of black pixels in the vertical and horizontal directions (distance A, B or C from a black pixel in FIG. 11 is 1 mm or less), the color of the pixel of interest (the current color is white) is replaced with the preceding color. This processing is called tailing processing. This processing is finally reflected in the marker editing area mode determining conditions shown in FIGS. 8 to 10.

After the above-described processing, print color data is input to an output conversion circuit 24 as a 4-bit color code. This data is switched by a selector 24A to the color code before area determination and input to a density generation print color determining circuit 24B. Although the function will be described later in detail, the selector 24A is used to realize a mode for performing printing immediately after color determination.

The density generation print color determining circuit 24B converts the 4-bit color code into CMYK data using a predetermined table. As for a black pixel, raw M data delayed by the FIFO is used to realize a halftone output (Although all of the CMYK data are ideally used, only the M data need be used because it corresponds to the density of a black pixel.). A black pixel is halftone-output to prevent a thin line from becoming thick.

There are three output conversion modes, i.e, a standard back mode, a standard blueback mode, and a special blueback mode. In the standard back mode, the color code generated by the area determining circuit 23A is converted using the CMYK data output table shown in FIG. 12 and output. In the standard blueback mode, a white portion in the standard back mode is output as a blue image, and a black portion is output as a white image. The standard blueback mode can be used for preparation of an OHP original or the like. The special blueback mode is almost the same as the standard blueback mode except that only a black portion in the paint mode is output as a black image. These modes can be switched by an operating portion (not shown).

Details of the output conversion are as shown in FIG. 13. Calculation is performed using an output color table in FIG. 12 and coefficients A, B, and C. The coefficients A, B, and C can be freely set to adjust the densities of black and color images. Since the black portion of an original is halftone-processed, output data of a portion whose print color is "black" or "color" in the line mode is determined using the density of raw M data. This processing is performed to prevent a thin line of the black portion of the original from becoming thick. In FIG. 13, "density"="magenta value of pixel of interest" (4-bit degeneration), and "inversion density"="black table"–"magenta value of pixel of interest"×C.

The output data is converted in accordance with the output color table as shown in FIG. 12. For this reason, when this table is converted, an arbitrary color can be output as multivalued data (When green is set in the blueback table, a greenback mode can be made.)

After the above processing, magnification, masking, and binarization of the CMYK data are performed by the magnification circuit 8, the masking UCR circuit 12, and the binarization circuit 15, and the like shown in FIG. 1. Thereafter, the data is sent to the TJ heads 18 and printed on recording paper.

As described above, in this embodiment, marker editing can be performed by the serial scanning method with a small memory for storing the delay data of processed pixels in the main scanning direction. In addition, the marking method uses an algorithm for allowing a gap, thereby coping with somewhat irregular marking.

In this embodiment, various changes and modifications can be made as follows.

(1) In the above embodiment, because of the vertical counter, pixels corresponding to a width of 1 mm on both the sides of the head must be used for counter calculation. With a processing system which does not allow a gap, no counter is needed because it is assumed that marking is strictly performed. Therefore, a simpler algorithm can be used to realize marker editing. In addition, the head portion used for only counter calculation can be used for printing, so that the print width is increased to improve the throughput of copying. Furthermore, since the algorithm is simplified, a compact hardware can be realized.

(2) In the above embodiment, the paint, the line, the line in paint modes are automatically determined. However, in consideration of a case wherein a single mode, e.g., only the paint mode is present in an original, the following four modes may be provided. More specifically, there are provided an area automatic determining mode, a paint fixing mode, a line fixing mode, and a color converting mode. The area automatic determining mode has the same content as that described in the above embodiment. In the paint fixing mode or the line fixing mode, if a color is present, the paint or the line mode is fixed. As was also described in the above embodiment, in the color converting mode, only a portion determined as a marker color portion is replaced with a corresponding value in the output conversion table and output. These modes can be switched by an operating portion (not shown).

Figure 14A:
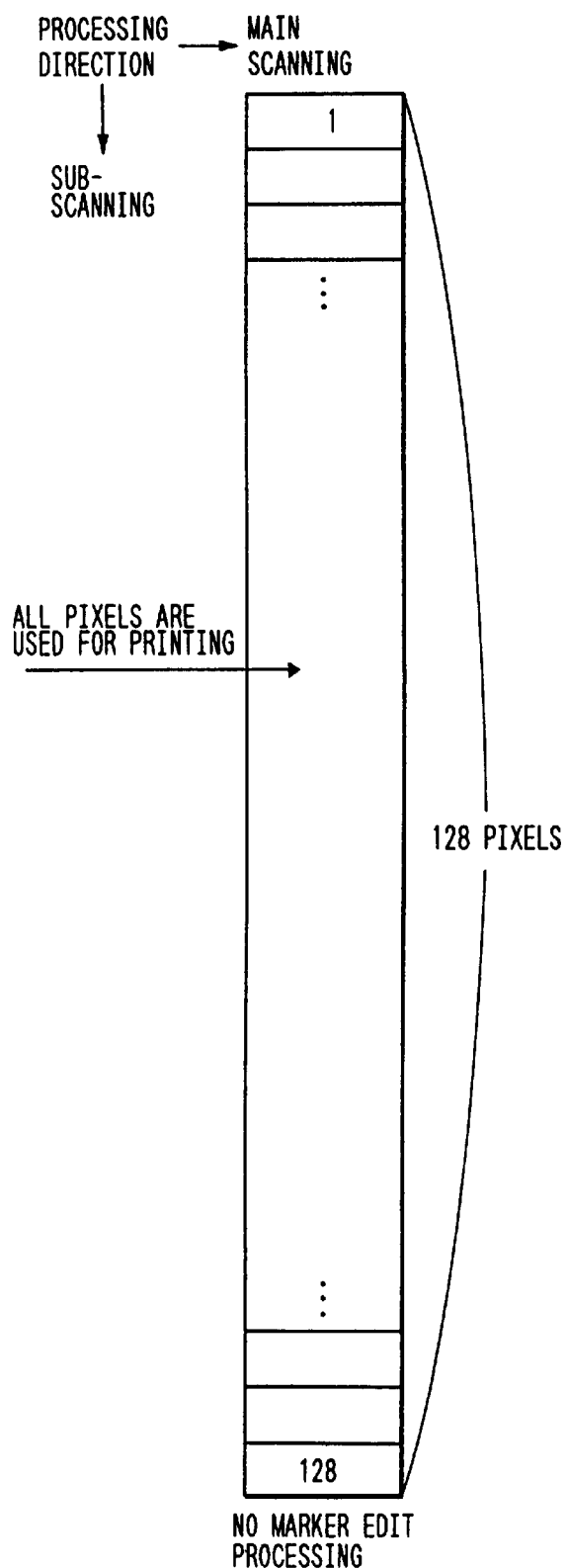
FIGS. 14A and 14B are explanatory views for explaining print width switching processing of an image processing apparatus according to the second embodiment of the present invention.
Figure 14B:
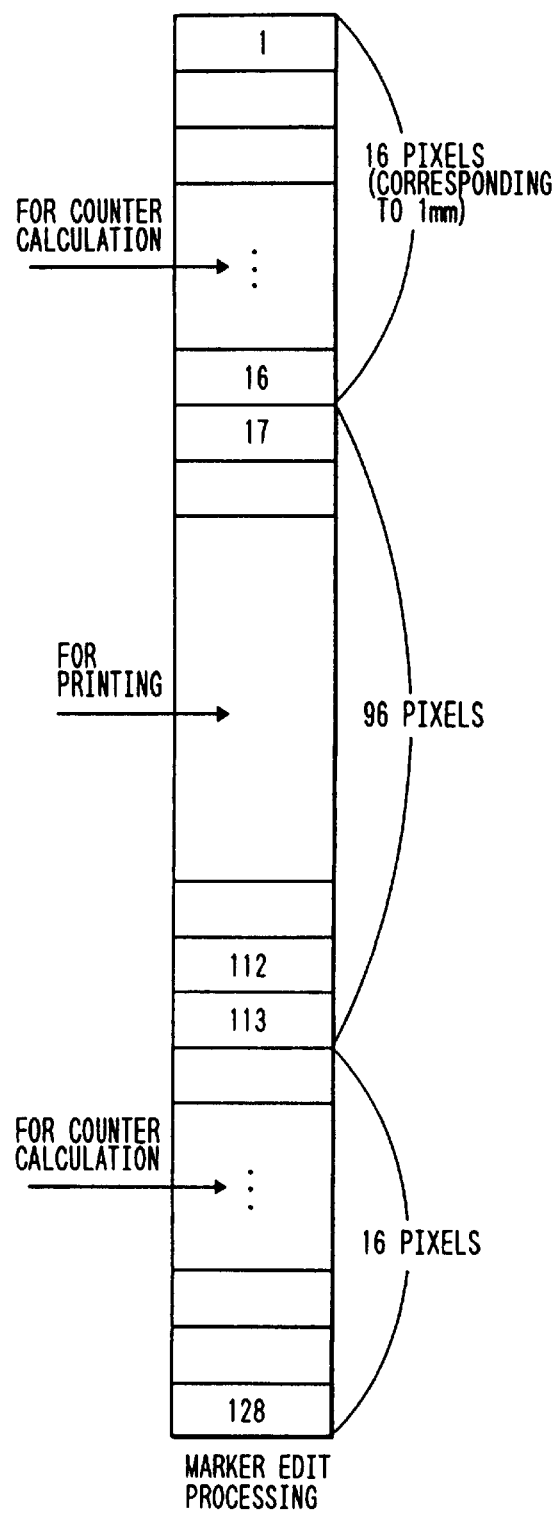
Figure 15:
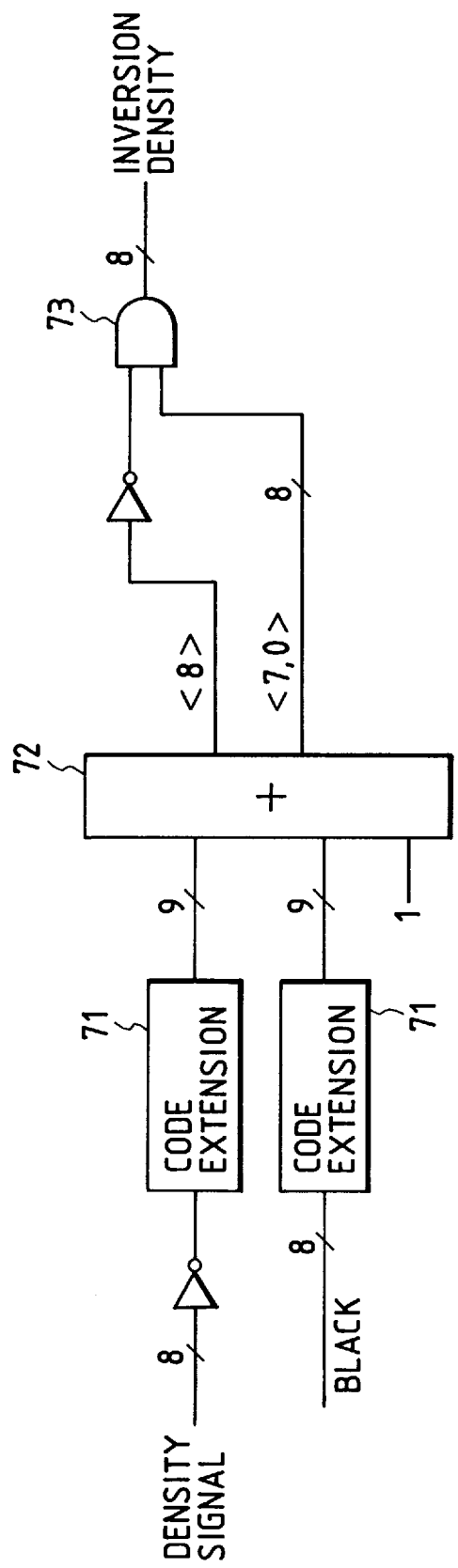
FIG. 15 is a circuit diagram showing the internal arrangement of a density generation print color determining circuit 24B in image processing apparatuses according to the third to fifth embodiments of the present invention.
Figure 16:
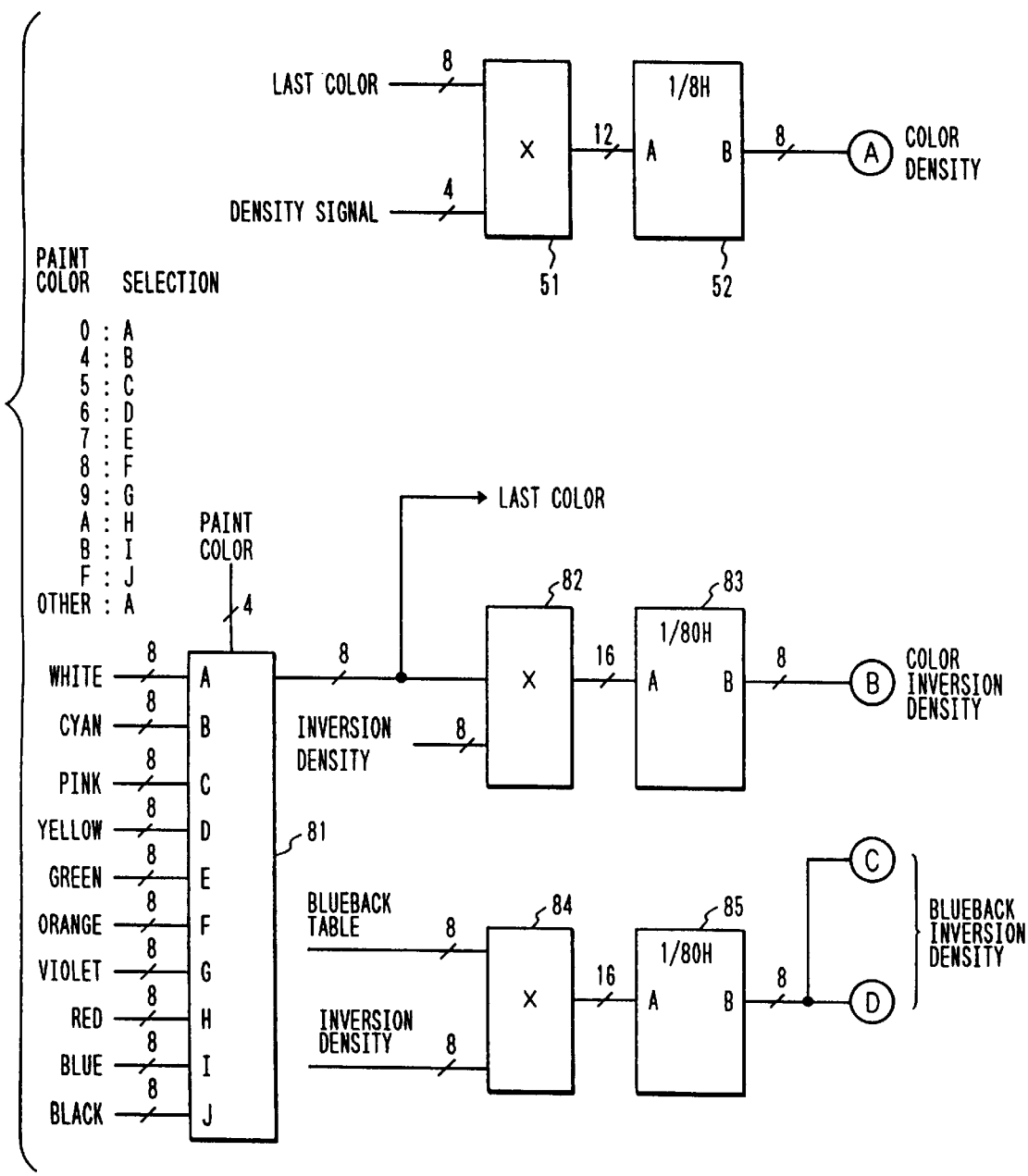
FIG. 16 is a circuit diagram following FIG. 15.
Figure 17:
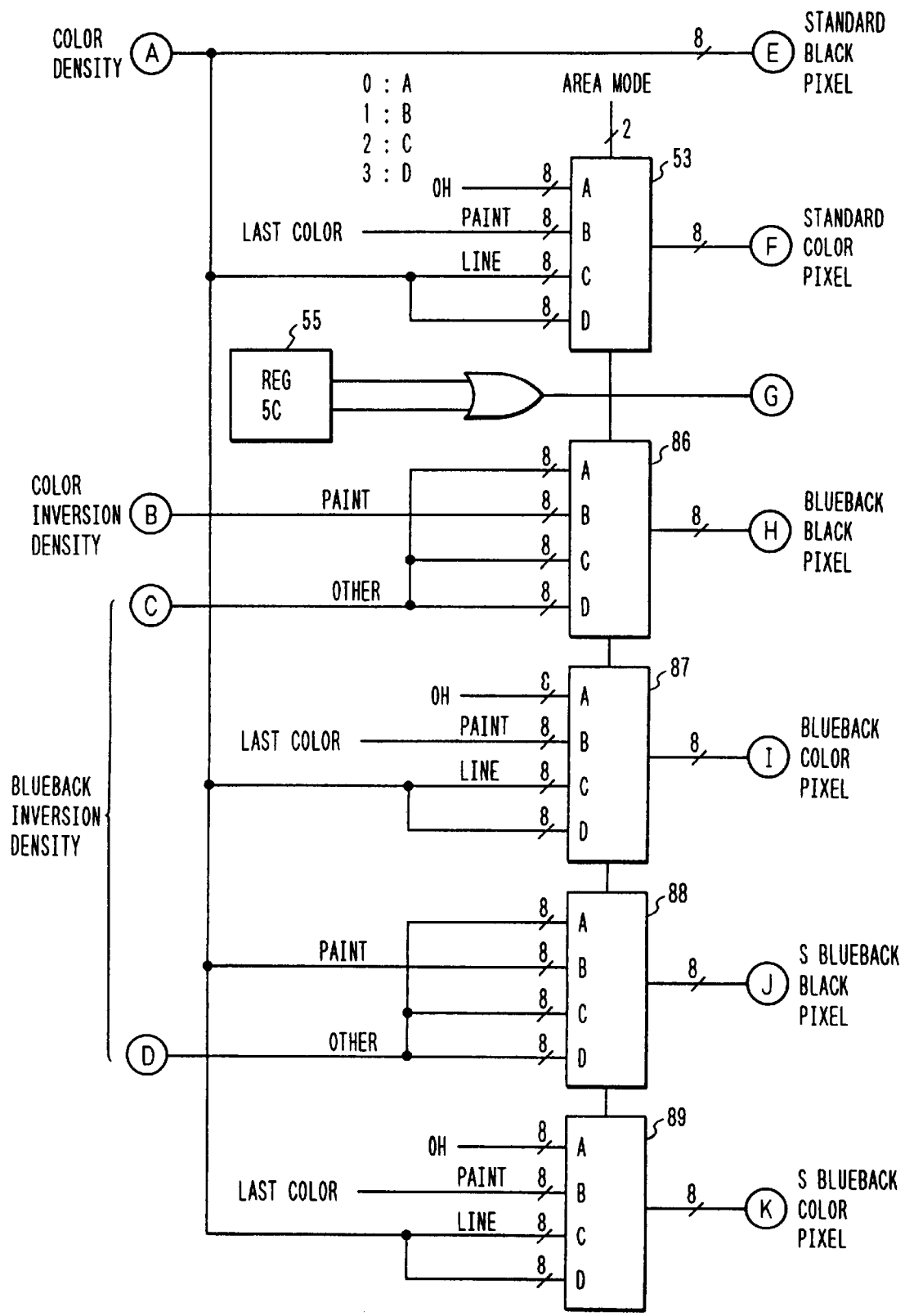
FIG. 17 is a circuit diagram following FIG. 16.
Figure 18:
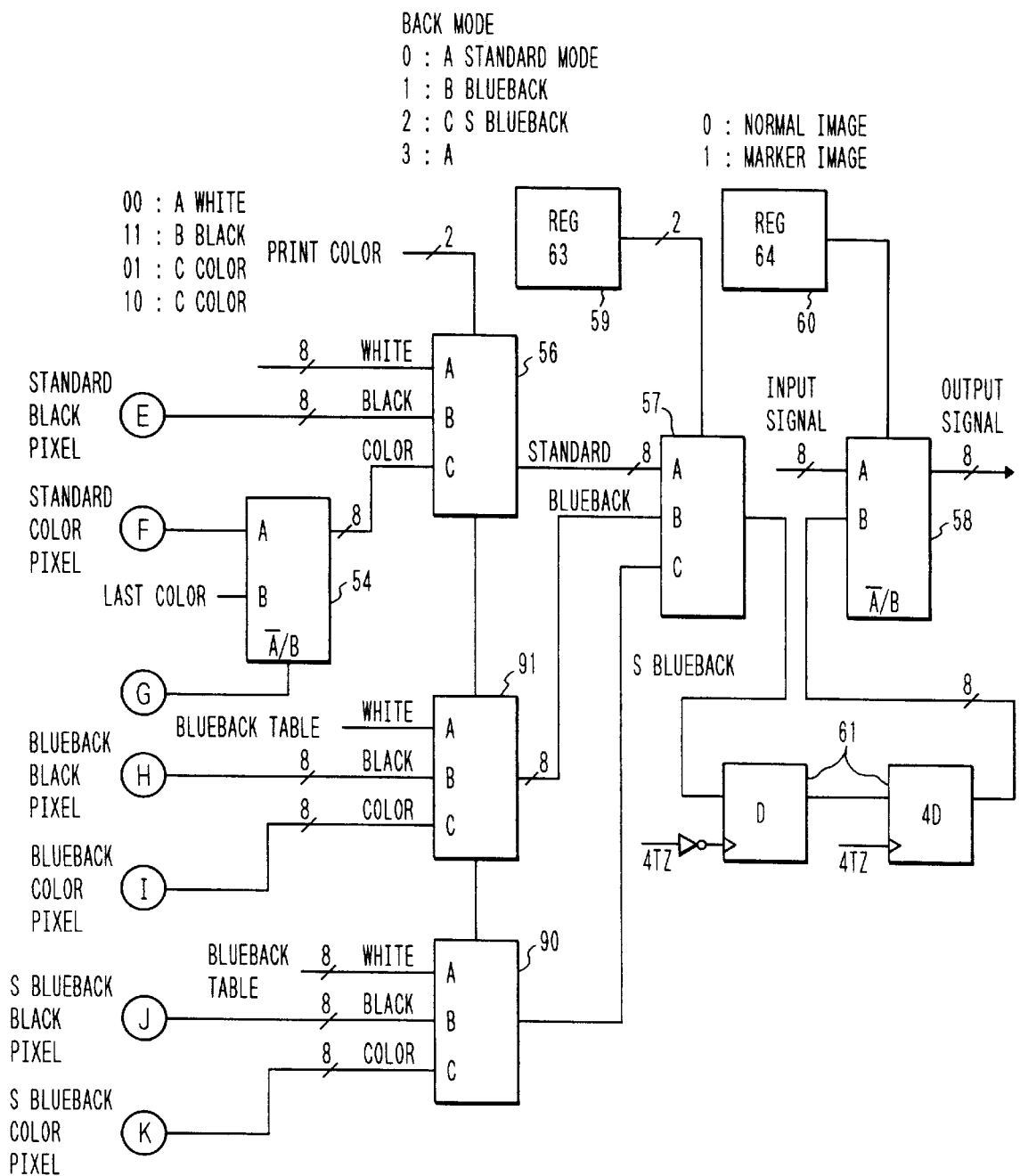
FIG. 18 is a circuit diagram following FIG. 17.

FIGS. 14A and 14B are explanatory views for explaining print width switching processing of an image processing apparatus according to the second embodiment of the present invention.

In the first embodiment, when marker editing processing is to be performed, a predetermined number of pixels at both the ends cannot be used for printing because of the vertical black distance counter for calculating a distance from a black pixel and the vertical color distance counter for calculating a distance from a color pixel along the alignment direction of the sensors (sub-scanning direction). Therefore, in marker editing processing, a decrease in print width cannot be avoided. However, this should not adversely affect processing when marker editing processing is not performed. In this embodiment, the number of pixels used for printing is changed in accordance with the presence/absence of marker editing, thereby efficiently using the pixels of the sensors. The entire arrangement of the apparatus is the same as that shown in FIG. 1.

On the sensor 1 side, an image corresponding to 128 pixels is read regardless of the presence/absence of marker editing. On the printing side, when marker editing processing is to be performed, from the 1st pixel to the 16th pixel and from the 113th pixel to the 128th pixel, i.e., a total of 32 pixels are used for counter calculation. For this reason, only 96 pixels from the 17th pixel to the 112th pixel are printed. Therefore, when marker editing processing is to be performed, the heads on both the sensor and printing sides process the image corresponding to 96 pixels along the sub-scanning direction.

When no marker editing processing is to be performed, an image corresponding to 128 pixels is printed. That is, 32 pixels which are not printed in marker editing processing are also printed. In no marker editing processing, the printing speed increases by 32 pixels per scanning operation as compared to the marker editing processing. As described above, in accordance with the presence/absence of marker editing, 128-pixel processing and 96-pixel processing are switched, thereby efficiently using print pixels.

The third embodiment of the present invention will be described below.

When processing suitable for the serial scanning method is to be performed, only a single color output is obtained because the color code and the print color are in a one-to-one correspondence upon output. To solve this problem, in this embodiment, when the color code is to be converted into print data, the output color table shown in FIG. 12 is arbitrarily rewritten, thereby obtaining a plurality of color outputs.

FIGS. 15 to 18 are circuit diagrams showing the internal arrangement of a density generation print color determining circuit 24B of an image processing apparatus according to the third embodiment of the present invention.

The arrangement and operation of the density generation print color determining circuit 24B for converting an arbitrary color code into an arbitrary multivalued data are as follows.

Referring to FIGS. 15 to 18, as a "density signal", an M signal is used because the level of the M signal is close to the density level. An "inversion density" is an inversion signal of the density signal obtained by the circuit in FIG. 15. "WHITE", "CYAN", . . . , and "BLACK" are multivalued data according to the table in FIG. 12. A "last color" is multivalued data of the color of a pixel, which is determined by the above-described marker determination, according to the table in FIG. 12. A "print color" indicates that the determined pixel is a white, black, or color pixel.

Multipliers 51 and 52 multiply a value (signal A) of the output color table, which corresponds to the determined print color code, by the density signal, i.e., the M value of the pixel of interest (the result is a signal B). A selector 53 switches the output in accordance with the area of the pixel of interest. A selector 54 receives an output from the selector 53 to select the value of the signal A or B in accordance with the value of a register 55.

A selector 56 selects white, black, or a color in accordance with the print color. Selectors 57 and 58 switch the output mode in accordance with the values of registers 59 and 60, respectively. A flip-flop 61 synchronizes the signals with each other. Finally, an output from the selector 58 is used as CMYK signals for printing. As a result, modulation is performed using the density signal. When a coefficient A in FIG. 13, which is a parameter of the density signal, is changed, originals with different colors can be generated from one original.

Color conversion is performed in accordance with the output color table shown in FIG. 12. For this reason, when the table is directly changed, an arbitrary color can be output without changing the coefficient A. For example, when the original is colored by a pink marker, only a predetermined pink color can be output. However, when the CMYK values of the output color table are changed to arbitrary values, an arbitrary pink color can be output. When a portion of the output color table, which corresponds to the color code of pink, is rewritten to CMYK values representing another color, this color can be output, as a matter of course.

After the above processing, magnification, masking, and binarization of the CMYK data are performed by a magnification circuit 8, a masking UCR circuit 12, a binarization circuit 15, and the like shown in FIG. 1, the data is sent to a printer portion (not shown) and printed.

The fourth embodiment will be described below.

In the third embodiment, the densities of the black and color portions are changed to output originals with different colors. In fact, an original to be subjected to marker editing is often used for an OHP sheet or the like. A standard blueback mode often used for the OHP original will be described.

In the standard blueback mode, a pixel determined as a black output pixel is converted into a color pixel, and a pixel determined as a white output pixel is converted into a blue pixel. Conversion from a black pixel into a white pixel is realized by density inversion to leave the density information of the black pixel. The circuit for density inversion is realized by circuits 71, 72, and 73 shown in FIG. 15. The circuits 71 constitute a code extension circuit. The value of a product of the M value of the pixel of interest and a coefficient C shown in FIG. 13 is input to the upper circuit 71, and the value of the black pixel of the output color table is input to the lower circuit 71. The circuit 72 is an adder and actually executes the subtraction of inversion density calculation in FIG. 13. The circuit 73 is a circuit for making an output result from the circuit 72 zero when the output result is 0 or less.

A selector 81 selects the CMYK values of the print color from the output color table, and multipliers 82 and 83 multiply the CMYK values by the inversion density. Multipliers 84 and 85 multiply the CMYK values for blueback by the inversion density. These values are used by selectors 86 and 87. The selector 86 switches the signal of a pixel determined as a black pixel in accordance with area determination. The inversion density of the paint determination color output from the multiplier 83 is selected in only the paint mode. The CMYK values of the inversion density for blueback are selected in the remaining area modes. The selector 87 switches the signal of a pixel determined as a color pixel in accordance with area determination. The value of the output color table is selected in the paint mode. In the line mode and the line in paint mode, a value which is density-adjusted by the multipliers 51 and 52 is selected.

A selector 91 is switched in accordance with an output-determined color to output the result to the selector 57. A characteristic feature upon realizing the blueback is as follows. When a white pixel is to be printed, the pixel has inversion density information of a black pixel. The output color therefore changes depending on the color for painting the dot portion. For this reason, to obtain a more natural image, the dot portion is painted with a paint determination color in the paint mode, and the remaining portion is painted with a blueback color. This is realized by the selectors 86 and 87.

With the above processing, an original in the standard blueback mode can be obtained.

The fifth embodiment of the present invention will be described below.

In the fourth embodiment, when an OHP original is to be prepared using the standard blueback mode, in some cases, it is preferable that only a title portion painted in the paint mode is output as a black image rather than replacing all the black portions with white portions. In this case, by using the special blueback mode to be described below, an output as described above can be obtained.

This embodiment is almost the same as the fourth embodiment except that, when a pixel is determined as a black output pixel, and the area mode is the paint mode, a normal density is used (an output from a circuit 52 is used) instead of an inversion density (instead of an output from a circuit 83).

The back mode described in the third to fifth embodiments can be selected by the selector 57 in accordance with the value of the register 59.

As described above, marker editing by the serial scanning method can be performed with a minimum necessary memory in real time without prescanning.

The pixels of read sensors or the like can be efficiently used.

A plurality of types of outputs can be obtained from a single original.

What is claimed is:

1. An image processing apparatus comprising:

reading means for reading an image within a predetermined width of an original by moving a sensor aligned along a first direction in a second direction;

determining means for determining an area designated by a marker in the original image read by said reading means, said determining means determining the area while reading the original image;

converting means for converting the pixel data of the original image read by said reading means in accordance with a determination result from said determining means;

recording means for driving a recording element aligned along a third direction in accordance with image data from said converting means and moving the recording element in a fourth direction to record the image having the predetermined width on a sheet; and control means for moving said reading means in the first direction by a distance less than the predetermined width to perform a next scanning operation in the second direction after said reading means completes a scanning operation in the second direction, wherein said control means moves said reading means by the distance less than the predetermined width in a marker editing mode and moves said reading means by a distance corresponding to the predetermined width in a non marker editing mode, and said recording means performs recording in accordance with the pixel data converted by said converting means in the marker editing mode and performs recording in accordance with the pixel data of the image read by said reading means in the non marker editing mode.

2. An apparatus according to claim 1, wherein said converting means performs color conversion of the area designated by the marker.

3. An apparatus according to claim 2, wherein said converting means performs color conversion of a black line designated by the marker.

4. An apparatus according to claim 2, wherein said converting means performs color conversion of an inside of a closed area designated by the marker.

5. An apparatus according to claim 1, wherein an operation of said reading means is synchronized with that of said recording means.

6. An apparatus according to claim 1, wherein said reading means comprises a color sensor.

7. An apparatus according to claim 1, wherein said recording means performs ink jet recording.

8. An apparatus according to claim 1, wherein said determining means uses pixel data of pixels at portions near opposite ends of said sensor as surrounding pixel data and uses pixel data of pixels at remaining portions as to-be-converted pixel data.

9. An apparatus according to claim 1, further comprising memory means for storing pixel data along the main scanning direction of said reading means, and wherein said determining means uses the pixel data stored in said memory means as surrounding pixel data.

10. An image processing apparatus having means for reading an image of an original, means for determining an area designated by a marker in the original, means for editing the image in the determined area, and means for recording the edited image, wherein said determining means, when there is a marker line that is wider than a line image on the line image in the read-in image of the original, determines that the line image is to be edited.

11. An apparatus according to claim 10, wherein the line image is a black line, and the black line is converted into a line image having another color.

12. An apparatus according to claim 10, wherein the image is a multivalued image.

13. An image processing apparatus having means for reading an image of an original, means for determining an area designated by a marker in the original, means for editing the image in the determined area, and means for recording the edited image, wherein said determining means, when there is a closed marker line inside and along a closed line of the image of the original, determines that the closed line image of the original image indicates the area to be edited.

14. An apparatus according to claim 13, wherein a paint processing is performed within the closed line image of the original image.

15. An apparatus according to claim 13, wherein the line image is a black line.

16. An apparatus according to claim 13, wherein a gap between the line image and the marker is corrected.

17. An apparatus according to claim 13, wherein the image is a multivalued image.

18. An image processing method comprising the steps of:

reading an image within a predetermined width of an original by moving a sensor aligned along a first direction in a second direction;

determining an area designated by a marker in the original image read in said reading step, said determining step determining the area while reading the original image;

converting the pixel data of the original image read in said reading step in accordance with a determination result in the determining step;

driving a recording element aligned along a third direction in accordance with the image converted in said converting step and moving the recording element in a fourth direction to record the image having the predetermined width on a sheet; and controlling moving the sensor in the first direction by a distance less than the predetermined width to perform a next scanning operation in the second direction after a scanning operation in the reading step is completed, wherein the controlling step comprises moving the sensor by the distance less than the predetermined width in a marker editing mode and moving the sensor by a distance corresponding to the predetermined width in a non marker editing mode, and the recording step comprises performing recording in accordance with the pixel data converted in the converting step in the marker editing mode and performing recording in accordance with the pixel data of the image read in said reading step in the non marker editing mode.

19. A method according to claim 18, wherein color conversion of the area designated by the marker is performed in the converting step.

20. A method according to claim 19, wherein color conversion of a black line designated by the marker is performed in the converting step.

21. A method according to claim 19, wherein color conversion of an inside of a closed area designated by the marker is performed in the converting step.

22. A method according to claim 18, wherein an operation in the reading step is synchronized with that in the recording step.

23. A method according to claim 18, wherein a color sensor is used in the reading step.

24. A method according to claim 18, wherein ink jet recording is performed in the recording step.

25. A method according to claim 18, wherein, in the determining step, pixel data of pixels at portions near opposite ends of said sensor are used as surrounding pixel data and pixel data of pixels at remaining portions are used as to-be-converted pixel data.

26. A method according to claim 18, further comprising the storing step of storing pixel data along the main scanning direction in the reading step, and wherein the pixel data stored in the storing step as the surrounding pixel data is used in determining step.

27. An image processing method in which an original is read, an area designated by a marker in the original is determined, the image in the determined area is edited, and the edited image is recorded, comprising the step of:

determining, when there is a marker line that is wider than a line image on the line image in the read-in image of the original, that the line image is to be edited.

28. A method according to claim 27, wherein the line image is a black line, and the black line is converted into a line image having another color.

29. A method according to claim 27, wherein the image is a multivalued image.

30. An image processing method in which an image of an original is read, an area designated by a marker in the original is determined, the image in the determined area is edited, and the edited image is recorded, comprising the step of:

determining, when there is a closed marker line inside and along a closed line of the image of the original, that the closed line image of the original image indicates the area to be edited.

31. A method according to claim 30, wherein a paint processing is performed within the closed line image of the original image.

32. A method according to claim 30, wherein the line image is a black line.

33. A method according to claim 30, further comprising correcting a gap between the line image and the marker.

34. A method according to claim 30, wherein the image is a multivalued image.

35. An image processing apparatus having means for reading an image of an original, means for determining an area designated by a marker in the original, means for editing the image in the determined area, and means for recording the edited image, wherein said determining means, when there is a marker line on a line image in an original image, determines that the line image is to be edited.

36. An apparatus according to claim 35, wherein a kind of editing which is performed on the line image which is traced over with the marker line is different from a kind of editing which is performed on an image designated by a closed marker line with which said image is not traced over.

37. An image processing method in which an original is read, an area designated by a marker in the original is determined, the image in the determined area is edited, and the edited image is recorded, comprising the step of:

determining, when there is a marker line on a line image in an original image, that the line image is to be edited.

38. A method according to claim 37, wherein a kind of editing which is performed on the line image which is traced over with the marker line is different from a kind of editing which is performed on an image designated by a closed marker line with which the image is not traced over.

39. An image processing apparatus comprising:

reading means for reading an image within a predetermined width of an original by moving a sensor aligned along a first direction in a second direction;

determining means for determining an area designated by a marker in the original image read by said reading means, said determining means determining the area while reading the original image;

converting means for converting pixel data of the original image read by said reading means in accordance with a determination result from said determining means; and control means for, after said reading means completes a scanning operation in the second direction, moving said reading means in the first direction to position said reading means to perform a next scanning operation in the second direction, wherein said control means moves said reading means by a distance less than the predetermined width in a marker editing mode and moves said reading means by a distance corresponding to the predetermined width in a non-marker-editing mode.

40. An apparatus according to claim 39, wherein said apparatus further comprises:

recording means for driving a recording element aligned along a third direction in accordance with image data from said converting means and moving the recording element in a fourth direction to record the image having the predetermined width on a sheet, wherein an operation of said reading means is synchronized with that of said recording means.

41. An apparatus according to claim 39, wherein said reading means comprises a color sensor.

42. An apparatus according to claim 39, wherein said apparatus further comprises:

recording means for driving a recording element aligned along a third direction in accordance with image data from said converting means and moving the recording element in a fourth direction to record the image having the predetermined width on a sheet, wherein said recording means performs ink jet recording.

43. An apparatus according to claim 39, wherein said determining means determines the area designated by the marker using to-be-converted pixel data and surrounding pixel data, wherein said determining means uses pixel data of pixels at portions near opposite ends of said reading means as surrounding pixel data and uses pixel data at remaining portions of said reading means as to-be-converted pixel data.

44. An apparatus according to claim 39, further comprising memory means for storing pixel data along the second direction, wherein said determining means determines the area designated by the marker using to-be-converted pixel data and surrounding pixel data, and wherein said determining means uses pixel data stored in said memory means as surrounding pixel data.

45. An apparatus according to claim 39, wherein said converting means performs color conversion of the area designated by the marker.

46. An apparatus according to claim 45, wherein said converting means performs color conversion of a black line designated by the marker.

47. An apparatus according to claim 45, wherein said converting means performs color conversion of an inside of a closed area designated by the marker.

48. An apparatus according to claim 39, wherein said apparatus further comprises editing means for editing an image in the area designated by a marker in the original, and wherein said determining means, when there is a marker line that is wider than a line image on the line image in a read-in image of the original, determines that the line image is to be edited.

49. An apparatus according to claim 48, wherein the line image is a black line, and the black line is converted into a line image having another color.

50. An apparatus according to claim 48, wherein the image is a multivalued image.

51. An image processing apparatus having means for reading an image of an original, means for determining an area designated by a marker in the original, means for editing the image in the determined area, and means for recording the edited image, wherein said determining means, when a closed marker line is in contact with one side of a closed line image of the original image, determines that the closed line image of the original image indicates the area to be edited.

52. An apparatus according to claim 51, wherein a paint processing is performed within the closed line image of the original image.

53. An apparatus according to claim 51, wherein the line image is a black line.

54. An apparatus according to claim 51, wherein a gap between the line image and the marker line is corrected.

55. An apparatus according to claim 51, wherein the image is a multivalued image.

* * * * *

UNITED STATES PATENT AND TRADEMARK OFFICE
CERTIFICATE OF CORRECTION

PATENT NO. : 5,892,596

DATED : April 6, 1999

INVENTOR(S): TAKASHI NONAKA, ET AL.

Page 1 of 2

It is certified that error appears in the above-identified patent and that said Letters Patent is hereby corrected as shown below:

TITLE [54]

"REFORMING" should read --PERFORMING--.

COLUMN 1

Figure 7A:
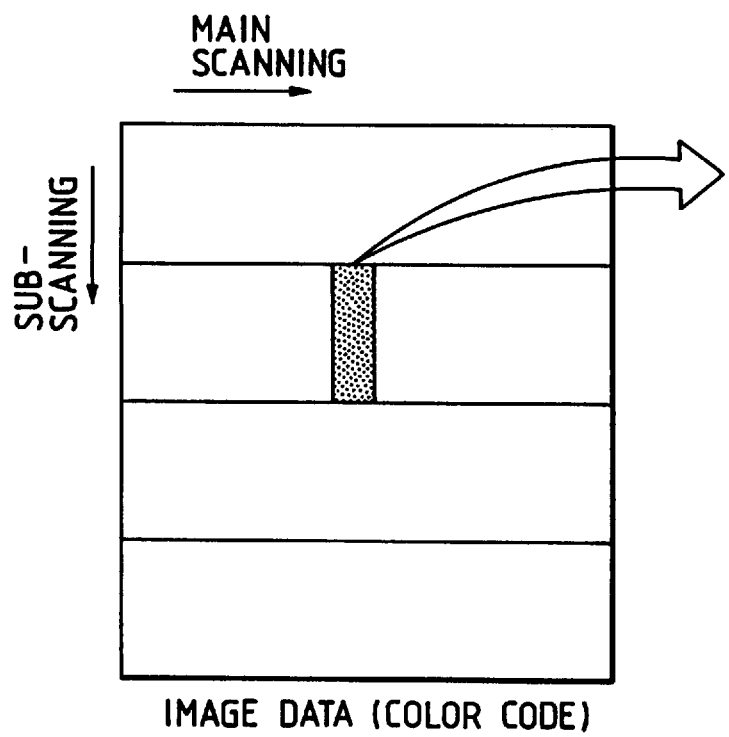
FIG. 7 is a view showing delay data upon area determination.
Figure 7B:
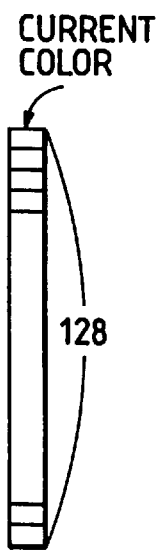
Figure 7C:
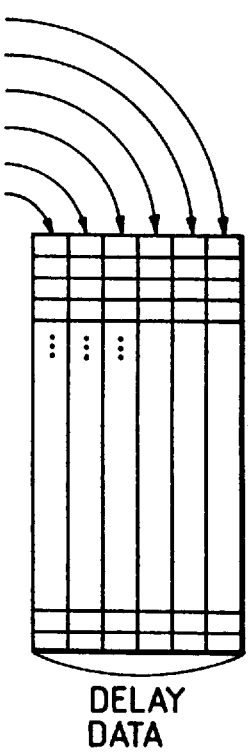

Line 2, "REFORMING" should read --PERFORMING--.
Line 48, "FIG. 3 which is comprised of" should be deleted, and "is a" should read --are--.
Line 49, "diagram" should read --diagrams--.
Line 57, FIG. 7 is a view" should read --FIGS. 7A-7C are views--.

COLUMN 2

Figure 19A:
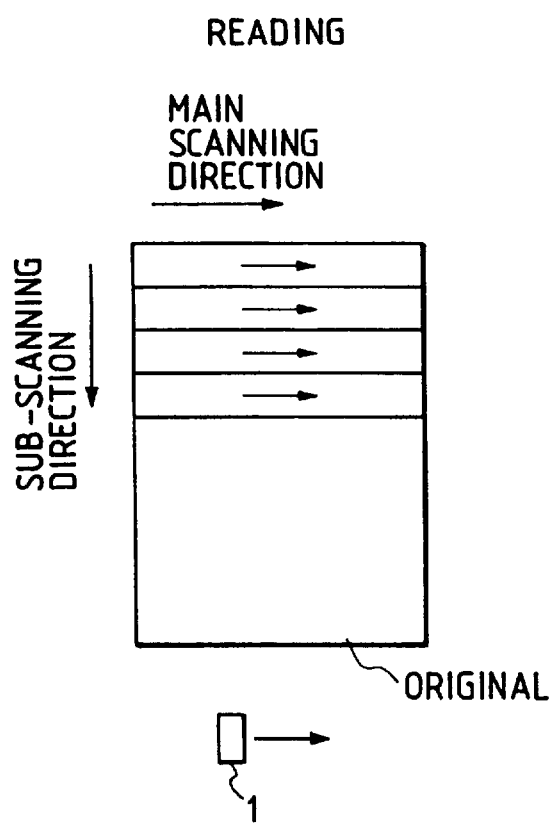
FIG. 19 is a view for explaining the movements of a scanner 1 and a TJ head 18.
Figure 19B:
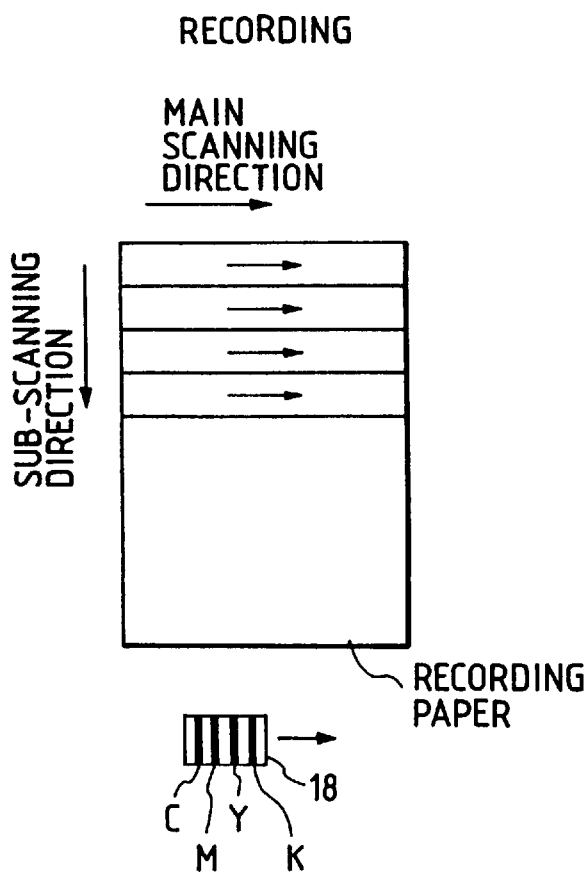

Line 10, "FIG. 19 is a view" should read --FIGS. 19A and 19B,--.

COLUMN 3

Line 12, "FIG. 19," should read --FIGS. 19A and 19B,--.

COLUMN 4

Line 62, "FIG. 7," should read --FIGS. 7A to 7C.--.

UNITED STATES PATENT AND TRADEMARK OFFICE
CERTIFICATE OF CORRECTION

PATENT NO. : 5,892,596

DATED : April 6, 1999

INVENTOR(S): TAKASHI NONAKA, ET AL.

It is certified that error appears in the above-identified patent and that said Letters Patent is hereby corrected as shown below:

COLUMN 10

Line 19, "non marker" should read --non-marker--.
Line 24, "non marker" should read --non-marker--.

COLUMN 11

Line 40, "non marker" should read --non-marker--.
Line 45, "non marker" should read --non-marker--.

Signed and Sealed this

Nineteenth Day of October, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO.   : 5,892,596
DATED        : April 6, 1999
INVENTOR(S)  : Takashi Nonaka et al.

It is certified that error appears in the above-identified patent and that said Letters Patent is hereby corrected as shown below:

Title page, Item [54] and Column 1, line 2,
Title, "REFORMING" should read -- PERFORMING --.

Column 1,
Line 48, "FIG. 3 which is comprised of" should be deleted, and "is a" should read -- are --.
Line 49, "diagram" should read -- diagrams --.
Line 57, "FIG. 7 is a view" should read -- FIGS. 7A-7C are views --.

Column 2,
Line 10, "FIG. 19 is a view" should read -- FIGS. 19A and 19B, --.

Column 3,
Line 12, "FIG. 19," should read -- FIGS. 19A and 19B, --.

Column 4,
Line 62, "FIG. 7," should read -- FIGS. 7A to 7C. --.

Column 10,
Line 19, "non marker" should read -- non-marker --.
Line 24, "non marker" should read -- non-marker --.

Column 11,
Line 40, "non marker" should read -- non-marker --.
Line 45, "non marker" should read -- non-marker --.

Signed and Sealed this

Twentieth Day of August, 2002

Attest:

*Attesting Officer*

JAMES E. ROGAN
*Director of the United States Patent and Trademark Office*